Jan. 28, 1969 J. F. J. KRUGERS 3,424,559
GASCHROMATOGRAPHY DETECTORS FOR PRODUCING ELECTRICAL SIGNALS THROUGH A TIME-CONSTANT NETWORK
Filed May 17, 1965
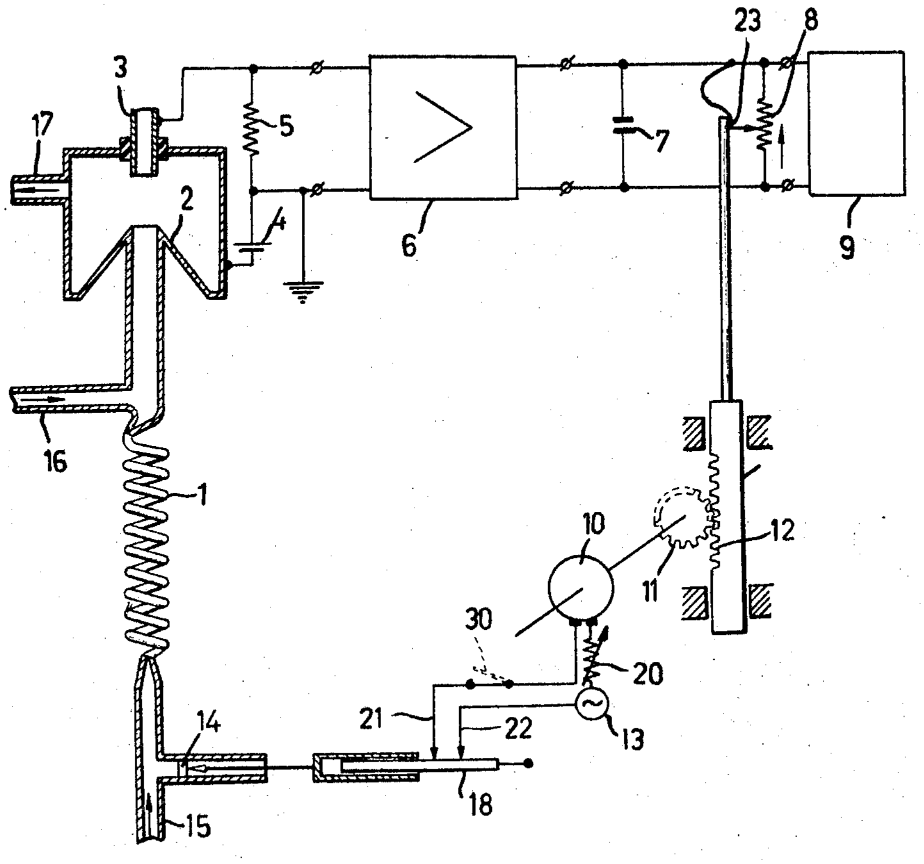
INVENTOR.
JOHAN F.J. KRUGERS
BY
[signature]
AGENT United States Patent Office 3,424,559

Patented Jan. 28, 1969

3,424,559
GAS CHROMATOGRAPHY DETECTORS FOR PRODUCING ELECTRICAL SIGNALS THROUGH A TIME-CONSTANT NETWORK

Johan Felix Jozef Krugers, Walnut Creek, Calif., assignor to North American Philips Company, Inc., New York, N.Y., a corporation of Delaware Filed May 17, 1965, Ser. No. 456,358
Claims priority, application Netherlands, May 29, 1964, 6406029
U.S. Cl. 23—254 6 Claims
Int. Cl. G01n 31/08

This invention relates to gas chromatography detectors for producing through a time-constant network, electric signals which are a measure of the concentration of components in a gas mixture to be detected.

Such a device is known. The term "gas chromatography" is to be understood to mean a method of separating components in the gaseous phase by which a high resolving power and hence a good separation between gaseous compounds is obtainable. To this end, the substance to be examined is led, usually mixed with a carrier gas, through a column. In the column the substance is split up into its various components which leave the column one after another according to time. Upon leaving the column, the components are detected by means of a detector which preferably gives an electrical signal, the magnitude of which is proportional to the instantaneous value of the concentration of the relevant component.

The signal is visualized, frequently after amplification, on the viewing screen of a cathode ray tube or on recording paper. The amplifier following the detector is inherently a time-constant network having an input capacitance which forms part of the amplifier. In the known device it is desired to keep the time constant of the network short and no additional capacitance is added to the input capacitance.

The known device suffers from a disadvantage. On the one hand, a minimum network time constant is desirable in order to follow rapid variations in the concentration of the instantaneous gas components. On the other hand, a maximum time constant is desired in order to suppress rapid variations occurring in the zero signal of the detector. The term "zero signal" is to be understood to mean the signal given by the detector if no additional component is added to the carrier gas.

An object of the invention is to obviate this disadvantage. To this end, means are provided in accordance with the invention for increasing the time constant of the network during a gas chromatographic cycle, especially in linear relationship with time.

Use is made of the recognition that the retention period of a gas component in the column influences the width of peak of the relevant component. More particularly the components will occupy a larger volume as they remain longer in the column. The relationship between the width of peak and the retention period may, to a good approximation, be assumed to be linear. The invention utilizes this relationship. At the beginning of the cycle, when the first component is brought into contact with the detector, the width of peak is comparatively small and the time constant may be short since the variations in the zero signal are small relative to the maximum signal in the peak, and the time constant must be short to prevent the peak from being distorted. At the end of the cycle, the width of peak of the final components is comparatively large and hence the maximum signal is comparatively small, but the variations in the zero signal are also small since the time constant is then long.

In the device according to the invention the frequency response curve of the amplifier is matched as far as possible to the requirements imposed upon the undistorted reproduction of a peak.

In order that the invention may be realized, one embodiment thereof will now be described in detail, by way of example, with reference to the accompanying diagrammatic drawing.

A gas-fractionating column 1 contains several gas components at certain distances from one another. These gas components are included in an inert carrier gas, for example nitrogen, which is mixed, after passage through the column 1, with a combustible mixture of gases from a duct 16. An injection piece 14 is provided at the inlet of the column 1. The carrier gas is supplied to the column 1 from a duct 15 whereas the gas mixture is removed through a burner 2 and a duct 17.

Opposite the burner 2, is an electrode 3. A voltage from a voltage source 4 is applied between the burner 2 and the electrode 3 through a high-ohmic resistor 5. Certain processes are accomplished in the flame, resulting in ions being produced. The voltage applied between the burner 2 and the electrode 3 thrus gives rise to an electric current which produces a voltage across the resistor 5. This voltage, which is proportional to the instantaneous concentration of the gas component in the burner 2, is amplified in an amplifier 6 and applied through an RC-network 7, 8 to a recording device 9.

According to the invention the resistor 8 is variable so that, at the beginning of the measurement, a low resistance is connected in parallel with the capacitor 7. The measurement is initiated by depressing an injection syringe 18 the handle of which thus connects together leads 21 and 22. An electric motor is connected to a supply voltage source 13. The shaft of the motor 10 carries a pinion 11 which meshes with a toothed rod 12. The rotating shaft of the motor thus sets the toothed rod 12 and hence a sliding contact 23 of the variable resistor 8 into movement in the direction indicated by an arrow. The speed of movement of the sliding contact is controlled by means of a resistor 20 connected in series with the electric motor. This speed is matched to the speed of flow of the gas components through the column 1 and to the properties of the column.

If desired, one of the leads 21 and 22 may include a switch 30 for switching-on the electric motor 10 a predetermined time after the injection syringe has been depressed.

There are several possibilities for connecting the high-ohmic resistor 5 and the voltage source 4 to the burner 2 and the electrode 3. The circuit shown is that in which a minimum interference signal across resistor 5 may be expected. With other modes of connection, for example with the burner 2 or the electrode 3 connected to ground, a comparatively large portion of the signal current may be lost in leak resistors.

In one embodiment the resistor 5 had a value of $10^9$ ohms; the terminal voltage of the source 4 was 100 volts; the amplifier 6 was an electrometer amplifier; the capacitor 7 was 1000 $\mu$f.; the resistor 8 varied during the measurement between 100 ohms and 10,000 ohms. The source 13 provided an alternating voltage of 220 volts; the resistor 20 was variable so that the speed of movement of the sliding contact 23 could be controlled between 0 and 20 ohms/sec.

In the column 1 a mixture of gases was split up into the components propane, heptane and decane. The recording device 9 showed deflections which exceeded the noise level even for the last ones of the series of components. For these components a concentration could still be demonstrated which was three times lower than that which can be detected with the conventional system.

It will be evident that the device according to the invention is applicable not only to the flame ionisation detector but also to other gas chromatographic detectors, for example, the catharometer and detectors working with a radio-active source.

Instead of varying the time constant of the RC-network, it is also possible to vary the bandpass width of the amplifier following the detector. Such a step affords the advantage that the noise may be suppressed more satisfactorily without detracting from the reproduction of the peak.

What is claimed is:

1. Apparatus for measuring the relative component concentrations in a gas mixture comprising a chromatographic column, first means for introducing said gas mixture to said column, second means coupled to said column for providing signals representative of said component concentrations, and third means, responsive to said first means, for varying the frequency response of said second means.

2. Apparatus for measuring the relative component concentrations in a gas mixture comprising a chromatographic column, inlet means for regulating the input of said gas mixture to said column, detector means coupled to said column for producing an electrical signal representative of each component concentration, amplifier means coupled to said detector, said amplifier initially having a short time constant for passing the short time duration signals from said detector, and control means coupled to said amplifier and responsive to said inlet means for increasing the time constant of said amplifier.

3. The combination of claim 2 wherein said control means includes means for increasing said time constant in a substantially time linear manner.

4. The combination of claim 2 wherein said amplifier means includes an R-C network for generating said time constant and said control means comprises a motor driven means coupled to said network for varying the time constant thereof at a rate dependent upon the rate of rotation of said motor, means for starting said motor at the beginning of the measuring cycle, said means for starting coupled to said inlet means and responsive thereto to start said motor upon the input of said gas mixture, and means coupled to said motor for matching the speed thereof to the flow of gas components through said column.

5. The combination of claim 2 wherein said column includes a flame ionization chamber having a burner therein for firing said gas mixture, said detector including an electrode inserted into said chamber and responsive to the ionization produced by the burning components of said gas mixture, impedance means for developing signals representative of said ionization connected between said detector and a reference point, a source of potential connected between said reference point and said burner, and means for deriving said component signal from said impedance.

6. Apparatus for measuring the relative component concentrations in a gas mixture comprising, a chromatographic column, wherein said column includes a flame ionization chamber having a burner therein for firing said gas mixture, inlet means for regulating the input of said gas mixture to said column, detector means coupled to said column for producing an electrical signal representative of each component concentration, said detector including an electrode inserted into said chamber and responsive to the ionization produced by the burning components of said gas mixture, impedance means for developing signals representative of said ionization connected between said detector and a reference point, a source of potential connected between said reference point and said burner, means for deriving said component signal from said impedance, amplifier means coupled to said detector, said amplifier initially having a short time constant for passing the short time duration signals from said detector, said amplifier means including an R-C network for generating said time constant, control means coupled to said network and responsive to said inlet means for increasing the time constant of said network, said control means comprising a motor driven means coupled to said network for varying the time constant thereof at a rate dependent upon the rate of rotation of said motor, said control means further including means coupled to said motor for increasing said time constant in a substantially time linear manner, means for starting said motor at the beginning of the measuring cycle, said means for starting coupled to said inlet means and responsive thereto to start said motor upon the input of said gas mixture, and means coupled to said motor for matching the speed thereof to the flow of gas components through said column.

References Cited

UNITED STATES PATENTS

| | | | |
|---|---|---|---|
| 3,063,051 | 11/1962 | Palm | 73—23.1 XR |
| 3,257,847 | 6/1966 | Levy et al. | 73—23.1 |
| 3,340,013 | 9/1967 | Rooney et al. | 23—254 |

MORRIS O. WOLK, *Primary Examiner.*

R. M. REESE, *Assistant Examiner.*

U.S. Cl. X.R.

23—232; 73—23.1